US012633695B2

(12) United States Patent
Elmanfalouti et al.

(10) Patent No.: US 12,633,695 B2
(45) Date of Patent: May 19, 2026

(54) MALE AND FEMALE POWER TERMINAL ASSEMBLY, FEMALE AND MALE POWER TERMINALS

(71) Applicant: Aptiv Technologies Limited, St. Michael (BB)

(72) Inventors: Abdelaaziz Elmanfalouti, Elancourt (FR); Sylvain Bossuyt, Boutigny Prouais (FR)

(73) Assignee: Aptiv Technologies AG, Schaffhausen (CH)

( * ) Notice: Subject to any disclaimer, the term of this patent is extended or adjusted under 35 U.S.C. 154(b) by 380 days.

(21) Appl. No.: 17/828,381

(22) Filed: May 31, 2022

(65) Prior Publication Data

US 2022/0384973 A1 Dec. 1, 2022

(30) Foreign Application Priority Data

Jun. 1, 2021 (EP) .................................... 21177265

(51) Int. Cl.
*H01R 13/11* (2006.01)
*H01R 24/20* (2011.01)

(52) U.S. Cl.
CPC ........... *H01R 13/111* (2013.01); *H01R 24/20* (2013.01); *H01R 2201/26* (2013.01)

(58) Field of Classification Search
CPC .... H01R 24/20; H01R 24/38; H01R 2201/26; H01R 13/111; H01R 13/052; H01R 13/18; H01R 13/187
USPC ......................................... 439/841, 842, 843
See application file for complete search history.

(56) References Cited

U.S. PATENT DOCUMENTS 3,793,610 A * 2/1974 Brishka .............. H01R 13/6277 439/352
4,662,706 A * 5/1987 Foley ................... H01R 13/187 439/843
5,195,904 A * 3/1993 Cyvoct ............. H01R 13/6277 439/349
5,588,852 A * 12/1996 Puerner .................. H01R 13/44 439/752

(Continued)

FOREIGN PATENT DOCUMENTS

CN 101478105 A 7/2009
CN 102025079 A 4/2011

(Continued)

OTHER PUBLICATIONS

European Search Report for EP Application No. 21177265.2, mailed Nov. 24, 2021.

(Continued)

*Primary Examiner* — Marcus E Harcum
(74) *Attorney, Agent, or Firm* — Billion & Armitage

(57) ABSTRACT

A male and female power terminal assembly including a male terminal having a male contact portion including an outer contact surface and an inner surface, and a female terminal having a female contact portion including a sleeve and a finger made of an electrically conductive material. The outer contact surface is electrically connected to an inner surface of the sleeve. Further, the male terminal includes a connecting member made of an electrically conductive material which is placed inside a cylindrical hollow portion of the male terminal, and which interconnects the finger with the inner surface.

14 Claims, 3 Drawing Sheets

(56) References Cited

U.S. PATENT DOCUMENTS

| | | | | | |
|---|---|---|---|---|---|
| 5,703,324 | A * | 12/1997 | Harder | H01R 24/38 174/21 C |
| 6,102,746 | A * | 8/2000 | Nania | H01R 24/40 439/675 |
| 7,311,566 | B2 * | 12/2007 | Dent | H01R 13/53 439/63 |
| 7,841,906 | B2 * | 11/2010 | Dent | H01R 13/187 439/675 |
| 8,246,392 | B2 * | 8/2012 | Amidon | H01R 24/40 439/842 |
| 8,272,901 | B2 * | 9/2012 | Rossman | H01R 4/183 439/660 |
| 10,348,037 | B2 * | 7/2019 | Ilie | H01R 13/2457 |
| 10,553,996 | B2 | 2/2020 | Yamanashi | |
| 10,804,623 | B2 | 10/2020 | Minamino | |
| 11,394,147 | B2 * | 7/2022 | Mangstl | H01R 13/052 |
| 11,848,516 | B2 * | 12/2023 | Scheer | H01R 13/17 |
| 2006/0025021 | A1 * | 2/2006 | Ishizaki | H01R 24/542 439/677 |
| 2010/0003866 | A1 | 1/2010 | Dent et al. | |
| 2020/0328569 | A1 | 10/2020 | Bossuyt et al. | |
| 2023/0208063 | A1 * | 6/2023 | Natter | H01R 13/17 439/843 |

FOREIGN PATENT DOCUMENTS

| | | | | |
|---|---|---|---|---|
| CN | 203800335 | U | 8/2014 | |
| CN | 203950953 | U | 11/2014 | |
| CN | 211376944 | U | 8/2020 | |
| CN | 113690681 | A | 11/2021 | |
| DE | 102013011216 | B3 | 10/2014 | |
| EP | 3599669 | A1 | 1/2020 | |
| EP | 3701272 | B1 | 9/2020 | |
| WO | 2013178433 | A1 | 5/2013 | |
| WO | WO-2020099881 | A1 * | 5/2020 | F16B 13/04 |

OTHER PUBLICATIONS

Rejection Response Decision Decision and English translation for CN Application No. 202210615402.7; CNIPA; mailed Aug. 11, 2025; 16 pages,.

"Machine translation of CN203800335U", 10 pages.

"Office Action for Chinese Application No. 202210615402.7"; Chinese National Intellectual Property Administration; mailed Jan. 25, 2025; 9 pages.

* cited by examiner

MALE AND FEMALE POWER TERMINAL ASSEMBLY, FEMALE AND MALE POWER TERMINALS

CROSS-REFERENCE TO RELATED APPLICATION

This application claims benefit of priority to European Patent Application No. 21177265.2 filed on Jun. 1, 2021, the entire disclosure of which is hereby incorporated by reference.

TECHNICAL FIELD OF THE INVENTION

The invention relates to the field of automotive connectors and more particularly to the field of power connectors for automotive vehicles. The invention relates in particular to a male and female power terminal assembly, as well as a male power terminal and a female power terminal.

BACKGROUND

In the field of automotive vehicles, including electric vehicles, hybrid vehicles and plug-in hybrid vehicles, high intensity currents can be transmitted through cables, cable harnesses and/or electrical power circuits, such as those interconnecting a battery, an electric motor, a converter, etc. When it is necessary to integrate connectors into cable networks intended to transmit such high intensity currents, connectors must be equipped with terminals having sufficient size and section so as to transmit these high intensity currents without excessive heating. Further, it is required to provide such male and/or female power terminals with an IP2X protection at their free end located near the mating face of the connector within which they are accommodated. As an example, U.S. Pat. No. 10,553,996 discloses a connector assembly, including a male power connector and a female power connector. The male power connector includes a male connector housing 1000 and at least one male terminal 100. The female connector includes a female power connector housing 2000 and at least one female terminal 200 (see FIG. 7). In this prior art terminal assembly, the male terminal 100 includes a male connection portion (not shown on FIG. 7) and a male contact portion 103. The male contact portion 103 includes a cylindrical hollow portion 105 made of an electrically conductive material, with an outer contact surface 110 and an inner surface 111. A protection element 120 made of insulting material is also mounted in the cylindrical hollow portion 105, so as to ensure, together with the mating face of the male connector housing 1000, a "finger touch" prevention function (for example according to the IP2X standard).

The female terminal 200 includes a female connection portion 202 and a female contact portion 203. The female contact portion 203 includes:

- a sleeve 204 made of an electrically conductive material, within which the male contact portion 103 is intended to be accommodated, and
- a finger 205 extending inside the sleeve 204, this finger 205 being made of an insulating material so as to ensure, together with the mating face of the female connector housing 2000, a "finger touch" prevention function.

The present disclosure aims at providing a connection solution for limiting the heating of the power terminals through which high intensity currents are transmitted.

SUMMARY

The present disclosure aims at providing a connection solution for limiting the heating of the power terminals through which high intensity currents are transmitted.

According to one or more aspects of the present disclosure, a male and female power terminal assembly includes a male terminal extending longitudinally in a back-to-front direction, from a male connection portion to a male contact portion, the male contact portion including a cylindrical hollow portion made of an electrically conductive material, with an outer contact surface and an inner surface. The male and female power terminal assembly also includes a female terminal extending longitudinally parallel to, and in the reverse direction to, the back-to-front direction, from a female connection portion to a female contact portion. The female contact portion has a sleeve made of an electrically conductive material, within which the male contact portion is accommodated and a finger extending inside the sleeve parallel to, and in the reverse direction to, the back-to-front direction from a base attached to the sleeve to a free end. The outer contact surface of the male terminal is electrically connected to an inner surface of the sleeve. The finger includes a conductive portion made of an electrically conductive material and in that the male terminal further includes a connecting member made of an electrically conductive material, which is placed inside the cylindrical hollow portion of the male terminal, and which interconnects the conductive portion with the inner surface of the cylindrical hollow portion.

In one or more embodiments of the assembly according to the previous paragraph, the finger includes a protection element, made of an electrically insulating material, and attached at the free end of the finger.

In one or more embodiments of the assembly according to any one of the previous paragraphs, the sleeve extends in the reverse direction to the back-to-front direction up to an opening extending in a plane perpendicular to the back-to-front direction and the conductive portion extends in the reverse direction to the back-to-front direction up the plane.

In one or more embodiments of the assembly according to any one of the previous paragraphs, the includes a plurality of resilient blades extending longitudinally parallel to the back-to-front direction up the plane and having at least one contact point electrically contacting the outer contact surface.

In one or more embodiments of the assembly according to any one of the previous paragraphs, the assembly includes a connecting member placed in the sleeve and including a plurality of resilient strips, each strip having at least one contact point electrically contacting the outer contact surface.

According to one or more aspects of the present disclosure, a female power terminal extends parallel to a longitudinal direction, from a female connection portion to a female contact portion. The female contact portion has a sleeve made of an electrically conductive material. The sleeve extends up to an opening extending in a plane perpendicular to the longitudinal direction. The female contact portion further has a finger extending inside the sleeve, parallel to a longitudinal direction, from a base attached to the sleeve to a free end. The finger includes a conductive portion made of an electrically conductive material.

In one or more embodiments of the female power terminal according to the previous paragraph, the conductive portion extends parallel to the longitudinal direction up to the plane.

In one or more embodiments of the female power terminal according to any one of the previous paragraphs, the finger includes a protection element, made of an electrically insulating material, and attached at the free end of the finger so as to stick out further from the opening.

In one or more embodiments of the female power terminal according to any one of the previous paragraphs, the sleeve includes a plurality of resilient blades extending longitudinally up the plane. Each blade has at least one contact point configured for electrically contacting the outer contact surface of a male terminal.

In one or more embodiments of the female power terminal according to any one of the previous paragraphs, the female power terminal further includes a connecting member placed in the sleeve and including a plurality of resilient strips. Each strip has at least one contact point configured for electrically contacting the outer contact surface of a male terminal.

According to one or more aspects of the present disclosure, a female power connector includes the female power terminal according to any one of the previous paragraphs and a female connector housing made of and electrically insulating material and defining at least one cavity for housing at least one female power terminal. The at least one cavity opening into an aperture configured for providing a "finger touch" prevention function, with a protection element mounted on the at least one female power terminal.

According to one or more aspects of the present disclosure, a male power terminal configured to interconnect with the female power terminal according to any one of the previous paragraphs is provided. The male power terminal extends longitudinally in a back-to-front direction, from a male connection portion to a male contact portion. The male contact portion including a cylindrical hollow portion made of an electrically conductive material, having an outer contact surface configured to be in electrical contact with the female terminal and having an inner surface. The male power terminal includes a connecting member made of an electrically conductive material, which is placed inside the cylindrical hollow portion, and which is configured to be in electrical contact with the female terminal.

In one or more embodiments of the male power terminal according to the previous paragraph, the cylindrical hollow portion is formed as an essentially tubular wall having a radial thickness equal or greater than 2.5 millimetres.

In one or more embodiments of the male power terminal according to any one of the previous paragraphs, a male connector includes a male connector housing made of an electrically insulating material and defining at least one cavity for housing at least one male power terminal, the at least one cavity opening into an aperture configured for providing a "finger touch" prevention function, with a protection element mounted on the at least one male power terminal.

BRIEF DESCRIPTION OF THE DRAWINGS

The present invention is now described, by way of example with reference to the accompanying drawings, in which.

DETAILED DESCRIPTION

Two examples of examples of embodiments of male and female terminal assemblies 1 are described below.

Figure 1:
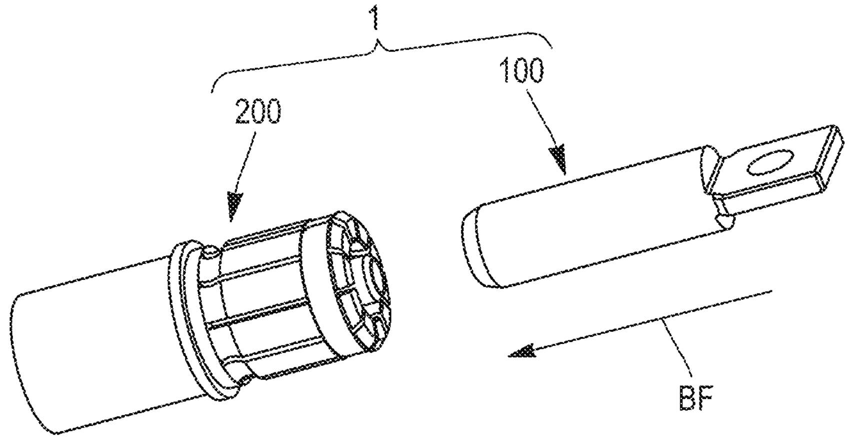
FIG. 1 is a schematic perspective view of a first embodiment of a male and female terminal assembly.
Figure 7:
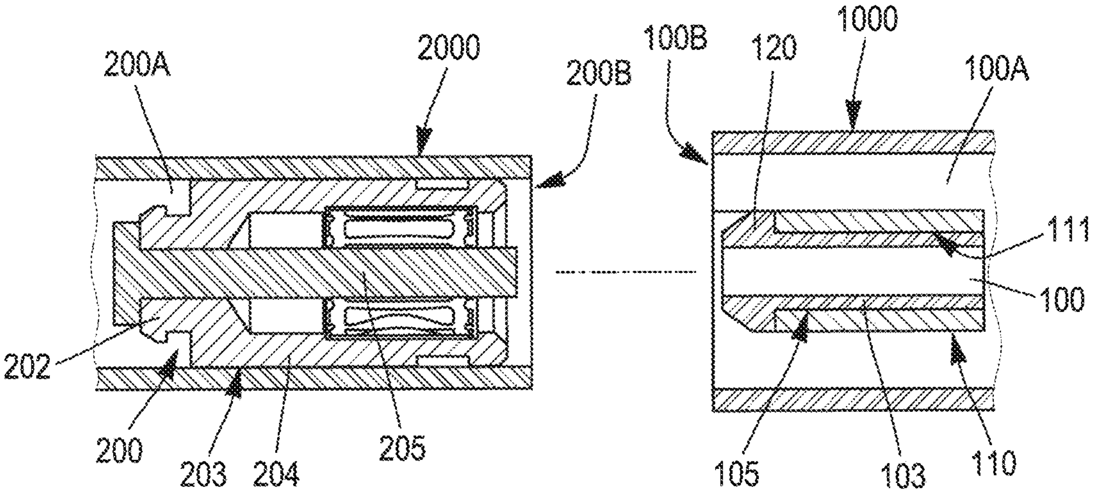
FIG. 7 PRIOR ART
FIG. 7 is a schematic longitudinal cross-section of an example of male and female terminal assembly according to the prior art.

According to these two examples, as shown in FIG. 1, the male and female terminal assemblies 1 include a male terminal 100 extending longitudinally in a back-to-front direction BF. The back-to-front direction BF is parallel to a mating direction, i.e., a direction along which the male terminal 100 is inserted in a female terminal 200 during the mating operation of the male and female connectors, respectively the male terminal 100 and female terminal 200. The male and female connectors include respectively a male connector housing 1000 and a female connector housing 2000, as illustrated in FIG. 7. The male and female connector housings 1000, 2000 are made of insulating material and are not described in detail as they can be of any type suitable for high intensity current and/or high voltage applications. For example, the male and female connector housings 1000, 2000 each have, as illustrated in FIG. 7 for a prior art connector assembly (the housings of the present disclosure are identical or similar to the housings of the prior art connectors), at least one cavity 100A, respectively 200A, accommodating the male terminal 100 or female terminal 200. Each cavity 100A, 200A opens into an aperture 100B, respectively 200B, made in the respective mating face of the male or female connector housing 1000, 2000. Each aperture 100B, 200B is configured so as to provide, together with appropriate protection elements 101, 201 respectively mounted on the male terminal 100 or the female terminal 200, a "finger touch" prevention function.

Figure 2:
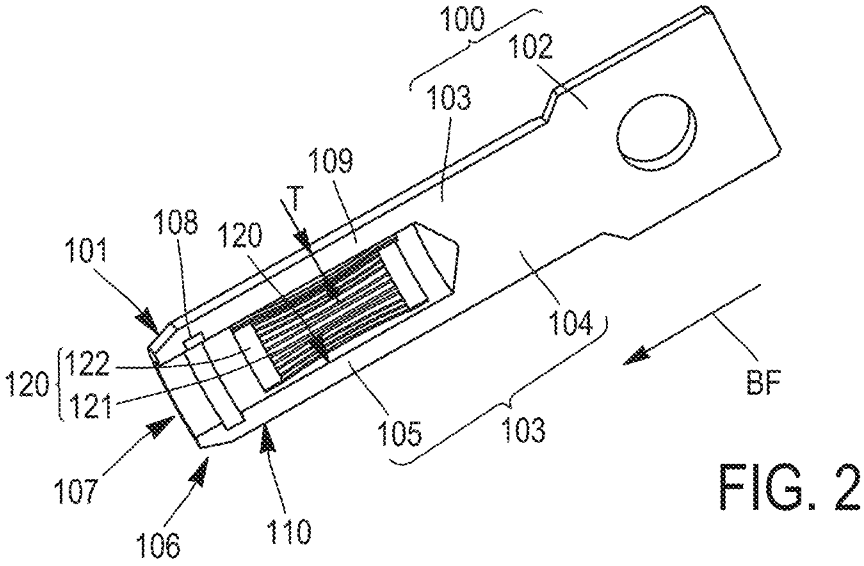
FIG. 2 is a schematic longitudinal cross-section of a male terminal configured for being used in the male and female terminal assembly illustrated in FIGS. 1 and 4, or the male and female terminal assembly illustrated in FIG. 5.

As illustrated in FIG. 2, the male terminal 100 includes a male connection portion 102 and a male contact portion 103. The male connection portion 102 and the male contact portion 103 are integrally formed with each other. In other words, the male connection portion 102 and the male contact portion 103 form a single-piece part. The male connection portion 102 and the male contact portion 102 are made of an electrically conductive material, such as a copper alloy. The male connection portion 102 is configured for electrically connecting, by crimping, soldering, bolting, etc. the male terminal 100 to an electrical cable, a busbar, or any other appropriate equipment. The male contact portion 103 includes a cylindrical solid portion 104 and a cylindrical hollow portion 105. The cylindrical hollow portion 105 extends in the back-to-front direction BF between the cylindrical solid portion 104 and a front end 106. The front end 106 is provided with an opening 107 and fitting features 108 configured to mount a protection element 101. For example, the protection element 101 has an essentially annular shape arranged in front and around the opening 107. The gap between the male connector housing 1000 and the protection element 101 is such that the "finger touch" prevention function is ensured.

For a male power terminal 100 having a diameter of 14 millimetres, the wall 109 of the cylindrical hollow portion 105 has for example a thickness T of about 2.5 millimetres. Such a thickness T is sufficient for carrying high intensity current at least up to 600 Amps.

The cylindrical hollow portion 105 has an outer contact surface 110 and an inner surface 111. A connecting member 120, made of an electrically conductive material, is placed inside the cylindrical hollow portion 105 of the male terminal 100. The connecting member 120 placed inside the cylindrical hollow portion 105 includes a plurality of resilient strips 121 each extending essentially longitudinally between two rings 122. Each ring 122 is in electrical contact with the inner surface 111 of the cylindrical hollow portion 105. Each strip 121 is bent so as to be able to resiliently be pushed toward the inner surface 111 and to exert a contact force at least one contact point.

Figure 3:
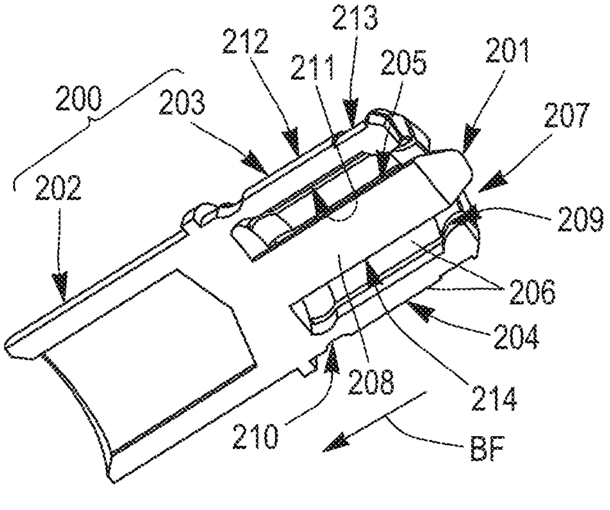
FIG. 3 is a schematic longitudinal cross-section of a female terminal configured for being used in the male and female terminal assembly illustrated in FIGS. 1 and 4.

As illustrated in FIG. 3, according to the first embodiment, the female terminal 200 extends longitudinally parallel to, and in the reverse direction to, the back-to-front direction BF, from a female connection portion 202 to a female contact portion 203. The female connection portion 202 and the female contact portion 203 are integrally formed with each other. In other words, the female connection portion 202 and the female contact portion 203 form a single-piece part. The female connection portion 202 and the female contact portion 203 are made of an electrically conductive material, such as a copper alloy. In the embodiment, illustrated in FIG. 3, the female connection portion 202 is configured for electrically connecting, by crimping and/or soldering, the female terminal 200 to an electrical cable. According to variations, the female connection portion 202 is configured to connect to a busbar or any other appropriate equipment.

The female contact portion 203 includes a sleeve 204 and a finger 205. The sleeve 204 and the finger 205 are integrally formed with each other. In other words, the sleeve 204 and the finger 205 form a single-piece part. The sleeve 204 and the finger 205 are made of an electrically conductive material. The sleeve 204 is configured so to receive the male contact portion 103 when the male and female connectors are mated. The sleeve 204 extends, in the reverse direction to the back-to-front direction BF, up to an annular opening 207. The annular opening 207 extends in a plane perpendicular to the back-to-front direction BF. The sleeve 204 includes a plurality of resilient blades 206 extending longitudinally, parallel to the back-to-front direction BF, up this plane. The finger 205 includes a conductive portion 208 made of an electrically conductive material. The conductive portion 208 extends in the reverse direction to the back-to-front direction BF essentially up this plane too. The protection element 201 is attached to the conductive portion 208 by overmolding, or by insertion of a portion of the protection element 201 into the conductive portion 208, or by insertion of a portion of the conductive portion 208 into the protection element 201, etc. The protection element 201 is made of an electrically insulating material and attached at the free end of the finger 205. The protection element 201 sticks out further from the annular opening 207 formed by the free end of the blades 206. In other words, the protection element 201 is placed essentially on the other side of the plane with regard to the free end of the blades 206. The gap between the female connector housing 2000 and the protection element 201 is such that the "finger touch" prevention function is ensured.

Each blade 206 is provided with at least one contact point. In the vicinity of the female connection portion 202, each blade 206 is provided with a narrow portion 210 in order to make the blade 206 more flexible. In the vicinity of its free end, on its inner surface 211, each blade 206 is provided with a bulge 209 extending from the inner surface 211 of each blade 206 toward the finger 205. In the vicinity of its free end, on its outer surface 212, each blade 206 is provided with a notch 213 configured to accommodate a spring ring (not shown) that both strengthens the female contact portion 203 and increases the contact force at the contact point located on each bulge 209.

Figure 4:
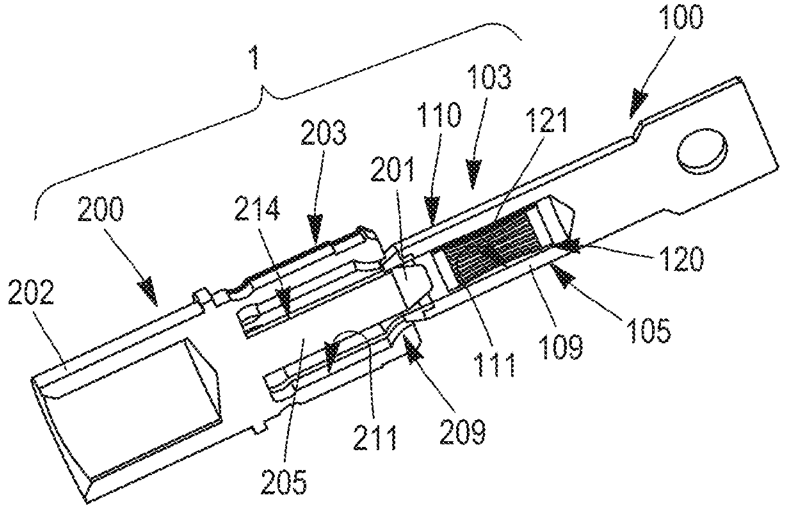
FIG. 4 is a schematic longitudinal cross-section of the male and female terminal assembly illustrated in FIG. 1.

When the male and female connectors are mated, the male contact portion 103 is inserted in the female contact portion 203. More particularly, the outer contact surface 110 of the male contact portion 103 faces (at least over a certain area) the inner surface 211 of the blades 206, and the bulges 209 make an electrical contact with the outer contact surface 110 of the male contact portion 103. Further, the inner surface 111 of the wall 109 of the cylindrical hollow portion 105 faces (at least over a certain area) the outer surface 214 of the finger 205, and the bent portion of the resilient strips 121 makes an electrical contact with the outer surface 214 of the finger 205. Therefore, between the male terminal 100 and female terminal 200, there are contact points between each blade 206 of the female terminal 200 and the male contact portion 103, but also between the finger 205 and the inner surface 111 of the male contact portion 103 through the connecting member 120 (see FIG. 4). Such a configuration allows for a conduction of higher current intensities through the male terminal 100 and the female terminal 200 without excessive heating.

Figure 5:
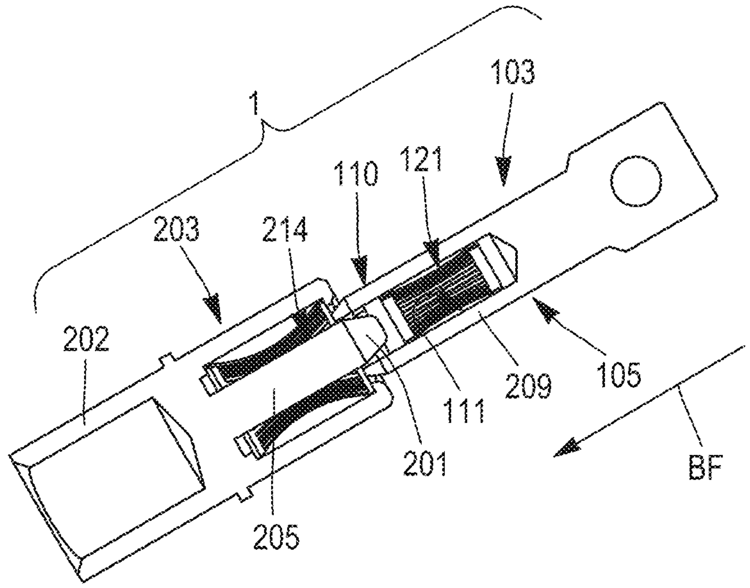
FIG. 5 is a schematic longitudinal cross-section of a male and female terminal assembly according to a second embodiment.
Figure 6:
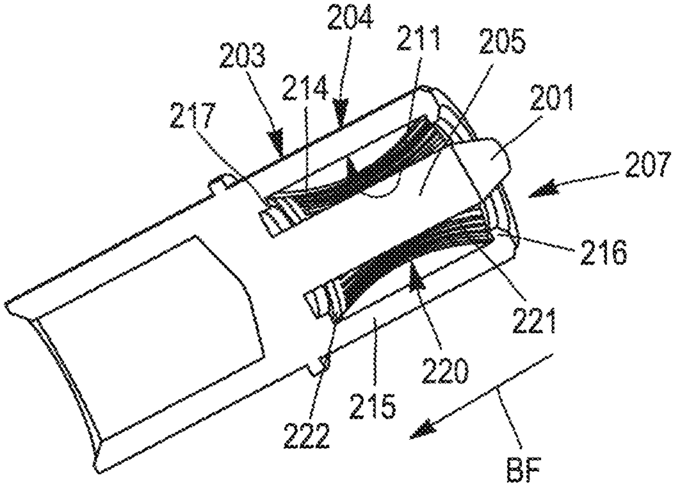
FIG. 6 is a schematic longitudinal cross-section of a female terminal configured for being used in the male and female terminal assembly illustrated in FIG. 5.

As illustrated in FIGS. 5 and 6, according to the second embodiment, the female terminal 200 differs from the first embodiment essentially by the sleeve 204 of its female contact portion 203. The female connection portion 202, the finger 205 and the protection element 201 are similar or the same as those already disclosed in connection with the first embodiment. They will not be described again.

The sleeve 204 and the finger 205 are integrally formed with each other. In other words, the sleeve 204 and the finger 205 form a single-piece part. The sleeve 204 and the finger 205 are made of an electrically conductive material. The sleeve 204 is configured so to receive the male contact portion 103 when the male and female connectors are mated. The sleeve 204 extends in the reverse direction to the back-to-front direction BF up to an annular opening 207. The annular opening 207 extends in a plane perpendicular to the back-to-front BF direction. The sleeve 204 includes a cylindrical wall 215 with an annular rib 216 around the annular opening 207. The rib 216 extends toward the finger 205, so as to maintain a connecting member 220 placed in said sleeve 204. The movement of the connecting member 220 parallel to the back-to-front direction BF is blocked in one direction by the rib 216 and in the opposite direction by a ledge 217 located at the bottom of the sleeve 204. The connecting member 220 includes a plurality of resilient strips 221 extending between two rings 222 stopped respectively by the ledge 217 and the rib 216. Each ring 222 is in electrical contact with the inner surface 211 of the cylindrical wall 215 of the female contact portion 203. Each strip 221 is bent toward the finger 205 so as to form a contact zone or contact point configured for electrically contacting the outer contact surface 110 of the male power terminal 100, when the male and female connectors are mated.

When the male connector 100 and the female connector 200 are mated, the male contact portion 103 is inserted in the female contact portion 203. More particularly, the outer contact surface 110 of the male contact portion 103 faces (at least over a certain area) the inner surface 211 of the cylindrical wall 215 of the female contact portion 203, and the bent portion of each strip 221 of the female terminal 200 makes an electrical contact with the outer contact surface 110 of the male contact portion 103. Further, the inner surface 111 of the wall 109 of the cylindrical hollow portion 105 faces (at least over a certain area) the outer surface 214 of the finger 205, and the bent portion of the resilient strips 121 of the male terminal 100 makes an electrical contact with the outer surface 214 of the finger 205. Therefore, between the male terminal 100 and female terminal 200, there are contact points between each strip 221 of the connecting member 220 mounted in the female terminal 200 and the male contact portion 103 of the male terminal 100, but also between the finger 205 and the inner surface 111 of the male contact portion 103 through the connecting member 120 of the male terminal 100. Such a configuration allows for a conduction of higher current intensities through the male terminal 100 and the female terminal 200 without excessive heating.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A female power terminal extending parallel to a longitudinal direction, from a female connection portion to a female contact portion, the female contact portion having an end configured to first receive a male terminal, said female contact portion comprising:

a sleeve made of an electrically conductive material, the sleeve extending up to an opening located at said end and extending in a plane perpendicular to the longitudinal direction; and a finger extending parallel to the longitudinal direction inside the sleeve from a base attached to the sleeve to a free end and further extending to the opening located at said end, wherein the finger is integral with the sleeve and formed of the electrically conductive material, wherein the sleeve comprises a plurality of resilient blades extending longitudinally up to the plane.

2. The female power terminal of claim 1, wherein a conductive portion extends parallel to the longitudinal direction up to the plane.

3. The female power terminal of claim 2, wherein the finger comprises a protection element, made of an electrically insulating material and attached at the free end of the finger so as to stick out further from the opening.

4. A male power terminal configured to interconnect with the female terminal according to claim 1, wherein the male power terminal extends longitudinally in a back-to-front direction, from a male connection portion to a male contact portion, wherein the male contact portion comprises a cylindrical hollow portion made of an electrically conductive material, having an outer contact surface configured to be in electrical contact with the female terminal and having an inner surface and wherein the male power terminal further comprises a connecting member made of an electrically conductive material, which is placed inside the cylindrical hollow portion and which is configured to be in electrical contact with the female terminal.

5. The male power terminal according to claim 4, wherein the cylindrical hollow portion is formed as an essentially tubular wall having a radial thickness greater than or equal to 2.5 millimetres.

6. A male and female power terminal assembly, comprising:

a male terminal extending longitudinally in a back-to-front direction, from a male connection portion to a male contact portion, the male contact portion comprising a cylindrical hollow portion made of an electrically conductive material, with an outer contact surface and an inner surface; and the female terminal according to claim 1, wherein the male terminal further comprises a connecting member made of an electrically conductive material, which is placed inside the cylindrical hollow portion of the male terminal, and which interconnects a conductive portion with the inner surface of the cylindrical hollow portion, each resilient blade or each resilient strip having at least one contact point configured to electrically contact the outer contact surface of a male terminal.

7. The assembly of claim 6, wherein the sleeve extends in the reverse direction to the back-to-front direction up to the opening extending in a plane perpendicular to the back-to-front direction and the conductive portion extends in the reverse direction to the back-to-front direction up to the plane.

8. The assembly according to claim 7, wherein the sleeve comprises a plurality of resilient blades extending longitudinally parallel to the back-to-front direction up the plane and having at least one contact point electrically contacting the outer contact surface.

9. A male and female power terminal assembly, comprising:

a male terminal extending longitudinally in a back-to-front direction, from a male connection portion to a male contact portion, the male contact portion comprising a cylindrical hollow portion made of an electrically conductive material, with an outer contact surface and an inner surface; and the female terminal according to claim 1, wherein the male terminal further comprises a connecting member made of an electrically conductive material, which is placed inside the cylindrical hollow portion of the male terminal, and which interconnects a conductive portion of the finger with the inner surface of the cylindrical hollow portion, each resilient blade or each resilient strip having at least one contact point configured to electrically contact the outer contact surface of a male terminal.

10. The assembly of claim 9, wherein the sleeve extends in the reverse direction to the back-to-front direction up to the opening extending in a plane perpendicular to the back-to-front direction and the conductive portion extends in the reverse direction to the back-to-front direction up to the plane.

11. The assembly according to claim 9, comprising a connecting member placed in the sleeve and comprising a plurality of resilient strips, wherein each strip has at least one contact point electrically contacting the outer contact surface.

12. A female power terminal extending parallel to a longitudinal direction, from a female connection portion to a female contact portion, the female contact portion having an end configured to first receive a male terminal, said female contact portion comprising:

a sleeve made of an electrically conductive material, the sleeve extending up to an opening located at said end and extending in a plane perpendicular to the longitudinal direction; and a finger extending parallel to the longitudinal direction inside the sleeve from a base attached to the sleeve to a free end and further extending to the opening located at said end, wherein the finger is integral with the sleeve and formed of the electrically conductive material, wherein the sleeve comprises a connecting member including a plurality of arcuate resilient strips.

13. The female power terminal according to claim 12, wherein each arcuate resilient strip has at least one contact point configured for electrically contacting an outer contact surface of a male terminal.

14. The female power terminal according to claim 12, wherein the connecting member has a plurality of arcuate resilient strips extending longitudinally between two rings.

* * * * *